(No Model.)  2 Sheets—Sheet 1.
T. P. ROBERTS.
MEANS FOR TRANSPORTATION AND DISTRIBUTION OF GAS.
No. 340,616. Patented Apr. 27, 1886.
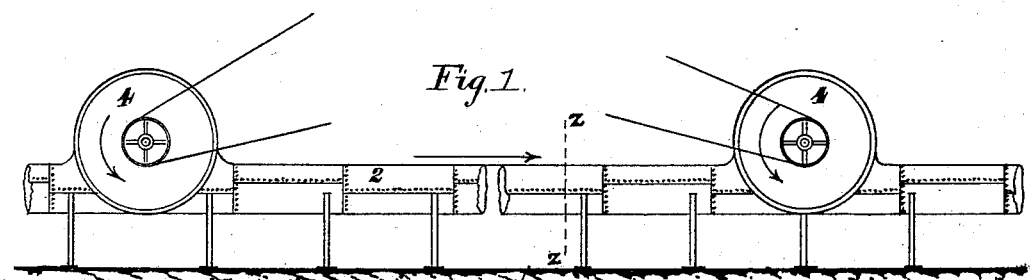
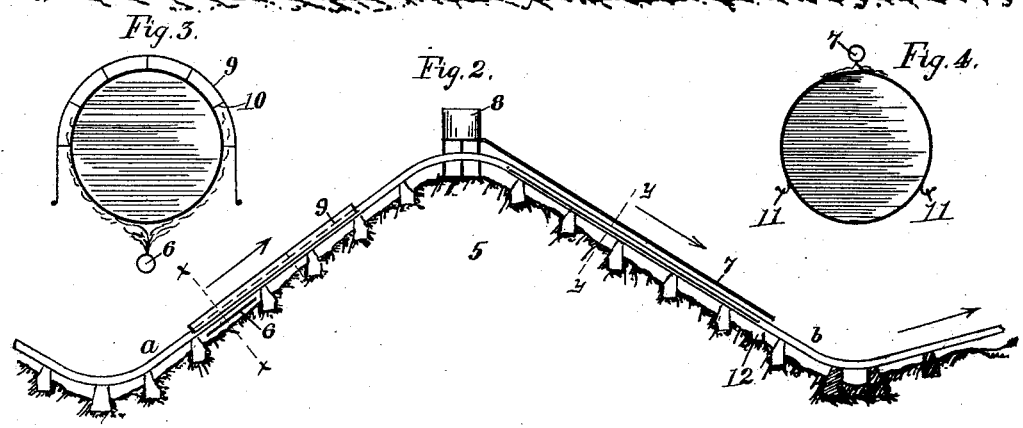
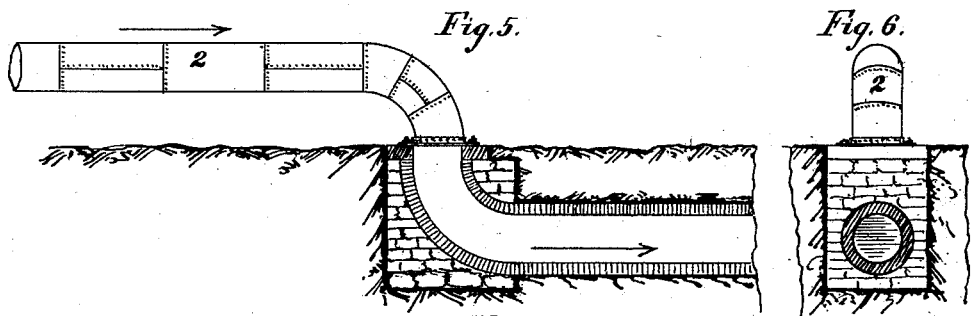
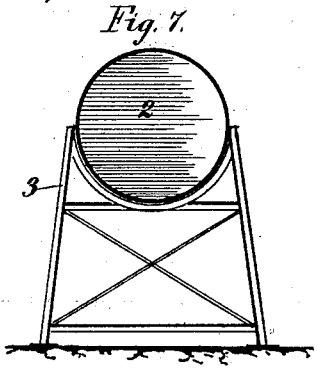
Witnesses.
J. A. Burns
N. L. Gill
Inventor.
Thomas P. Roberts
by his Attorneys
Bakewell & Kerr

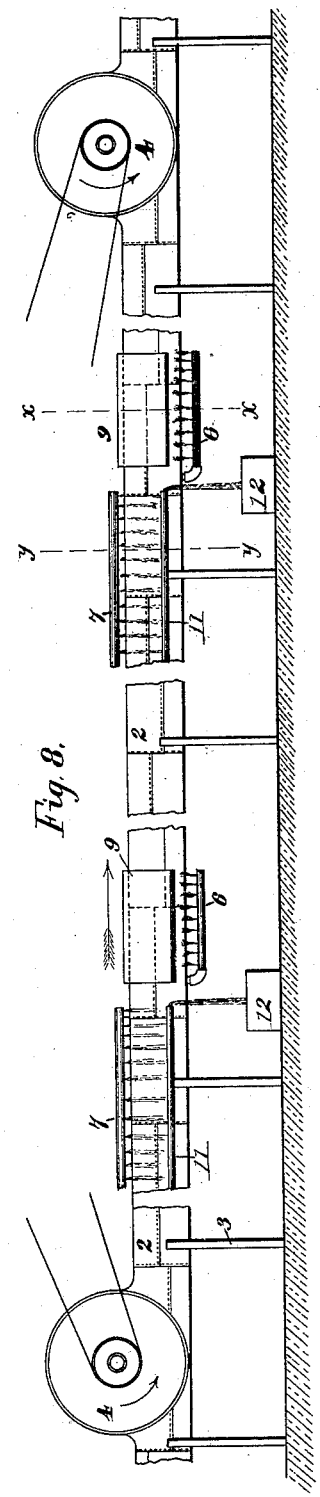

UNITED STATES PATENT OFFICE.

THOMAS P. ROBERTS, OF PITTSBURG, PENNSYLVANIA.

MEANS FOR TRANSPORTATION AND DISTRIBUTION OF GAS.

SPECIFICATION forming part of Letters Patent No. 340,616, dated April 27, 1886.

Application filed December 24, 1885. Serial No. 186,596. (No model.)

*To all whom it may concern:*

Be it known that I, THOMAS P. ROBERTS, of Pittsburg, in the county of Allegheny and State of Pennsylvania, have invented a new and useful Improvement in the Means for Transportation and Distribution of Gas; and I do hereby declare the following to be a full, clear, and exact description thereof.

The recent discovery of natural gas in certain manufacturing districts of this country in larger quantities than necessary to supply the demands of those places makes it desirable to transport the gas to other less-favored localities. The gas comes from the wells at an enormous pressure—from some of the wells at a pressure of two hundred pounds to the square inch over atmospheric pressure—and it has been attempted to convey it at this pressure for long distances through pipes. In these attempts, however, engineers have met the following difficulties: The high pressure requires the pipes to be made of stout heavy iron, and to be strongly jointed together, in order to prevent leaking. This entails great expense of material and difficulty in transporting the pipes from place to place, and in order to reduce the expense within practical limits the pipes have been made of about ten inches in diameter. With this size of pipe the gas will, at the distance of thirty miles from the well, be reduced by friction from, say, two hundred pounds to the square inch to but little in excess of normal atmospheric pressure, so that the quantity delivered will be too inappreciable to be of commercial value. These facts have confined the use of natural gas in the arts within a small area; and it is the object of my invention to provide a system whereby it can be conveyed at any distance from the point of supply at small cost and little trouble.

It consists in conveying the gas at a low pressure, in a conduit or pipe of large diameter, through which a constant current of the gas is maintained, either by the aid of fans or by the application of heat, or both, as will be hereinafter more fully explained.

Of course, the larger the diameter of the conduit the greater is the amount of gas which can be forced through it at a given pressure, and the less is the resistance. I apply this principle to practical use, in avoiding the evils of friction above indicated, by making the conduit large enough to supply the desired amount of gas, which I force through it at a low or normal pressure.

I will now describe my invention so that others skilled in the art of gas-distribution may apply the same to use, reference being had to the accompanying drawings, forming part of this specification, in which—

Figure 1 is a side elevation of a gas-conduit illustrating the application of my improved system. Fig. 2 is a side elevation on a smaller scale, showing a modification. Fig. 3 is a vertical cross-section on the line $x$ $x$ of Figs. 2 and 8. Fig. 4 is a vertical cross-section on the line $y$ $y$ of Figs. 2 and 8. Fig. 5 is a side view of a modified form of conduit, shown partly in longitudinal section. Fig. 6 is an end view of Fig. 5. Fig. 7 is a vertical cross-section on the line $z$ $z$ of Fig. 1. Fig. 8 is a side elevation of a gas-conduit, clearly illustrating the application of my invention to a level or horizontal system of pipe.

Like symbols of reference indicate like parts in each.

In the drawings, (see particularly Figs. 1 and 8,) 2 represents a gas conduit or main, which is shown suitably mounted on supporting-brackets 3 above the level of the ground. This main leads from the gas-well to the place of delivery, and may be of many miles in extent. It is preferably made of sheet-iron, the sheets of which are riveted together, as shown in the drawings.

The gas is introduced into the adit of the conduit at low pressure, by which I mean the normal atmospheric pressure, or any pressure less than five pounds to the square inch over the atmospheric pressure. Under these circumstances the course of the gas would be slow, and to accelerate its progress at intervals along the line I provide rotary fan-blowers 4, set in the usual way within drums, and having their blades projecting into the conduit. In this way, by locating the fans at suitable distances along the line, a constant current of the gas may be maintained without materially increasing its pressure or density. For example, suppose the diameter of the main to be five feet, and the gas contained to be at about normal pressure, a fan-blower driven by an engine of about twenty-horse power will impel or induce a current of the gas at a speed of ten miles per hour, and at the delivery end, supposing this rate to be maintained all along the line, the discharge of gas will be at the rate of one million cubic feet per hour. Of course, if the gas-pressure be at all above the normal, the delivery will be proportionately increased.

I have estimated that with a straight line of pipe the fans may be set as far apart as forty miles or more, and the regular flow still be maintained, and that by thus spacing them the gas may as well be conveyed for a distance of six or seven hundred miles as through a line twenty miles long.

The advantage of thus conveying the gas at low pressure will be apparent when it is considered that a very light material may be used in the structure of the pipes, and that the loss from leakage will be comparatively small. Thus, a pipe of five feet diameter may be made of No. 14 sheet-iron, whose cost is much less than that of a cast or wrought iron pipe of the size which would be needed to deliver the same amount of gas at high pressure. With so large a main as I have indicated, and with such relatively low pressure of gas, the friction or resistance is reduced to a minimum, and but little power need be used in actuating the fans.

Another very important advantage which is derived from the use of my improved system is, that it affords means for the utilization of many gas-wells which are now of practically no value, because of the low pressure of their discharge.

It is evidently impracticable to connect the delivery-pipe of a ten-pound well with a gas-main containing gas at two hundred pounds pressure, and it is economically bad practice to attempt to convey such low-pressure gas in mains in the ordinary way for distances of more than a few miles. Weak wells have therefore been allowed to waste uselessly when they are situate at considerable distances from manufacturing centers, and it has been estimated that in Butler county, Pennsylvania, there is a waste from this cause of seventy million cubic feet of gas per diem, which if utilized would be equal in money value to four thousand dollars. I propose to save this waste by the connection of such wells with my system of conduits, in which the gas may be readily conveyed at low pressure to any place. At the delivery end, to which the gas is preferably drawn by an exhaust-fan, it may be supplied either at the pressure in which it flows through the conduit, or it may be collected in a suitable tank and increased in density, as may be found to be the more desirable.

In the use of fans for creating the current of gas through the main it will be preferable to use them on the exhaust principle, rather than for the purpose of driving or impelling the gas. Thus, if a fan be stationed at the delivery end of the main and be continuously driven, the distance through which its influence will be exerted in drawing the gas is almost limitless, while if the fan be at the source of the main it will impel the gas by creating a pressure, and the current thus created will be exhausted within a few miles. The principles governing this phenomenon are founded on known rules of philosophy. The fans which I have shown at intermediate points along the line will of course act in both ways, and will drive the gas in front of them and will draw or suck the gas in the rear.

Figs. 2, 3, and 4 illustrate a modification of the system, which may be used alone or in combination with the fans above described. 5 represents a hill over which the gas-conduit passes. $a$ is the ascending leg of the pipe, and $b$ the descending leg. Under a part of the ascending leg is arranged a burner-pipe, 6, which is perforated to permit escape of gas, and is connected with the gas-main, while over a part of the descending leg $b$ is a pipe, 7, which leads from a water reservoir, 8, and is perforated to discharge a spray of water upon the conduit. If, now, the gas be turned into the burner-pipe 6 and ignited, it will heat the leg $a$ and cause an expansion and rarefaction of its gas, and, on the contrary, the flow of water from the pipe 7 will chill the descending leg $b$ and its contents, and will correspondingly condense the gas. This rarefaction and condensation, by varying the specific gravities of the gas in the two parts of the main, will cause the latter to act as a siphon and will maintain an even flow through the pipe over the hill through a distance, it may be, of several miles.

In Fig. 3 I have illustrated a convenient adjunct to the use of the heating device 6, which consists of a hood, 9, which covers the pipe, and is separated laterally therefrom by arms 10. The burning gas then, instead of heating merely the bottom of the conduit, will circulate around the sides on the inside of the hood, and will thus economize its heating capacity. So, in Fig. 4 I have shown the main provided with small lateral troughs or gutters 11, which catch the water trickling down the sides of the main from the supply-pipe 7 and conduct it to a receptacle, 12, from which it may be pumped back to the reservoir-tank 8.

Fig. 8 illustrates the application of heat and cold as propelling agents to a gas-conduit built on a level. Here, using the same reference, figures as employed in Fig. 2, 6 is a gas-burner pipe, which is arranged under the main at a suitable point and extending thereunder, say, for fifty feet. A few feet or yards back of the situation of the burner is a water-pipe, 7, which discharges upon the surface of the pipe and produces a condensation of the gas, as before explained. The rarefaction and expansion of the gas caused by the burner 6 will induce a current, which will be in the direction of the arrow, because the condensation of the gas at the rear of the burner will prevent expansion and flow in that direction, and the course of the gas must therefore be onward. The action of this feature of my improvement is very similar to the phenomenon observed in chimney flues and stacks where is a continual on-rush of hot air and its substitution by the colder strata behind. It is my design to utilize this heating and chilling device at convenient points along the conduit at places where the use of the fans may be inconvenient or for any reason undesirable. They may be separated at long distances apart, as indicated in Fig. 8, by the breaking away of the pipe-line, or may be interposed at proper intervals between the fan-blowers 4.

I do not desire to limit myself to the employment of the pipe-burners 6 and water-cooling pipes, since suitable heating-furnaces and any convenient cooling devices may be used instead thereof.

In Figs. 5 and 6 I have shown a part of the main made of sheet-iron and another part, consisting of an underground conduit, c, built of masonry or concrete, and having its inner walls suitably lined with cement to prevent diffusion of the gas. These and similar modifications may be left to the judgment of the users and the peculiar circumstances of each case. The masonry tunnel is of value when the conduit is of large diameter.

I am aware of Letters Patent No. 323,840, granted to George Westinghouse, Jr., on August 4, 1885, and desire to disclaim the system of gas-distribution therein shown and described.

What I claim as my invention, and desire to secure by Letters Patent, is—

1. An improvement in the art of long-distance gas-distribution, consisting in introducing the gas from the well into a continuous main or conduit of such sufficient diameter in proportion to the natural pressure of the gas as to reduce the pressure to or nearly to that of the atmosphere, and drawing and forcing the gas through such main by means of fans or equivalent pneumatic pumps placed at suitable intervals along the line, substantially as described.

2. An improvement in the art of gas distribution and transportation, which consists in conveying the gas through a main and assisting or creating the current of gas therethrough by the application of heat at one point and the chilling of the gas at another point, substantially as and for the purposes described.

3. An improvement in the art of gas transportation and distribution, which consists in conveying a non-liquefiable gas through a main at low pressure and creating or assisting the upward and downward current of gas therethrough by varying the temperature of the gas in the main accordingly as it has to be moved upward or downward, substantially as and for the purposes described.

In testimony whereof I have hereunto set my hand this 23d day of December, A. D. 1885.

THOMAS P. ROBERTS.

Witnesses:
W. B. CORWIN,
THOMAS W. BAKEWELL.